US012696891B2

(12) United States Patent
Schwartz et al.

(10) Patent No.: US 12,696,891 B2
(45) Date of Patent: Aug. 4, 2026

(54) CRAWLING INSECT PITFALL TRAP AND METHODS OF USING

(71) Applicant: Ecolab USA Inc., Saint Paul, MN (US)

(72) Inventors: Daniel Ronald Schwartz, Cottage Grove, MN (US); Morgan Ann Manderfield, Inver Grove Heights, MN (US); Alicia Nichole Gettis, Northfield, MN (US)

(73) Assignee: Ecolab USA Inc., Saint Paul, MN (US)

( * ) Notice: Subject to any disclaimer, the term of this patent is extended or adjusted under 35 U.S.C. 154(b) by 32 days.

(21) Appl. No.: 18/887,981

(22) Filed: Sep. 17, 2024

(65) Prior Publication Data

US 2025/0098658 A1      Mar. 27, 2025

Related U.S. Application Data

(60) Provisional application No. 63/584,693, filed on Sep. 22, 2023.

(51) Int. Cl.
A01M 1/10 (2006.01)
A01M 1/14 (2006.01)

(52) U.S. Cl.
CPC .............. A01M 1/103 (2013.01); A01M 1/14 (2013.01); *A01M 2200/011* (2013.01)

(58) Field of Classification Search
CPC ........................ A01M 1/103; A01M 2200/011
(Continued)

(56) References Cited

U.S. PATENT DOCUMENTS 970,528 A * 9/1910 Miller ................... A01M 1/103
43/121
1,024,767 A * 4/1912 Dempster ............. A01M 1/103
43/121
(Continued)

FOREIGN PATENT DOCUMENTS

FR        2859598 A1 * 3/2005 ............. A01M 1/02
WO   WO-2015054609 A1 * 4/2015 ........... A01M 1/103
(Continued)

OTHER PUBLICATIONS

"International Application Serial No. PCT US2024 047103, International Search Report mailed Dec. 10, 2024", 4 pgs.
(Continued)

*Primary Examiner* — Christopher P Ellis
(74) *Attorney, Agent, or Firm* — Schwegman Lundberg & Woessner, P.A.

(57) ABSTRACT

A crawling insect pitfall trap configured be placed on a surface can include a plurality of connected walls and a fibrous layer. The plurality of connected walls can be configured to rest on the surface and can each be sloped to form a pitfall cavity and to form a top edge at an opening of the pitfall cavity. The plurality of connected walls can each include an outer surface that is smooth. The sloped and smooth surfaces can be configured to dissuade climbing by a crawling insect. The fibrous layer can be applied to at least a portion of an outer surface of at least one wall of the plurality of connected walls, and can extend from about where the at least one wall rests on the surface to the top edge of the at least one wall. The fibrous layer can promote climbing by the crawling insect.

20 Claims, 9 Drawing Sheets

(58) Field of Classification Search
USPC .......................................................... 43/123
See application file for complete search history.

(56) References Cited

U.S. PATENT DOCUMENTS

| 1,621,318 | A | * | 3/1927 | Edwards | ............... | A01M 1/103 |
| | | | | | | 43/121 |
| 2,997,806 | A | * | 8/1961 | Duvall | .................... | A01M 1/02 |
| | | | | | | 43/121 |
| 4,214,400 | A | * | 7/1980 | Patmore | .................. | A01M 1/14 |
| | | | | | | 43/121 |
| 4,263,740 | A | * | 4/1981 | Hemsarth | ............... | A01M 1/14 |
| | | | | | | 43/121 |
| 8,413,370 | B2 | * | 4/2013 | Messian | .................. | A01M 1/14 |
| | | | | | | 43/123 |
| 8,707,615 | B2 | * | 4/2014 | Cullen | .................. | A01M 29/34 |
| | | | | | | 43/107 |
| 2007/0044372 | A1 | | 3/2007 | Lang et al. | | |
| 2011/0225873 | A1 | | 9/2011 | Mcknight et al. | | |
| 2012/0186136 | A1 | | 7/2012 | Schneidmiller et al. | | |
| 2013/0180161 | A1 | * | 7/2013 | Vasudeva | ................ | A01M 1/14 |
| | | | | | | 43/123 |
| 2014/0250766 | A1 | | 9/2014 | Singh et al. | | |
| 2015/0173339 | A1 | * | 6/2015 | Stier | ..................... | A01M 1/103 |
| | | | | | | 43/107 |
| 2016/0227753 | A1 | | 8/2016 | White et al. | | |
| 2018/0055034 | A1 | | 3/2018 | Sanford | | |
| 2019/0098886 | A1 | | 4/2019 | Thuis et al. | | |
| 2021/0212305 | A1 | * | 7/2021 | Woods | ..................... | A01M 1/04 |
| 2022/0110309 | A1 | * | 4/2022 | White | ..................... | B31B 50/26 |
| 2022/0155482 | A1 | | 5/2022 | Woodbury et al. | | |
| 2023/0035726 | A1 | * | 2/2023 | White | .................. | B31B 50/742 |

FOREIGN PATENT DOCUMENTS

| WO | WO-2024055065 A1 | * | 3/2024 | ........... | A01M 1/103 |
| WO | 2025064428 | | 3/2025 | | |

OTHER PUBLICATIONS

"International Application Serial No. PCT US2024 047103, Written Opinion mailed Dec. 10, 2024", 6 pgs.

* cited by examiner

CRAWLING INSECT PITFALL TRAP AND METHODS OF USING

CROSS-REFERENCE TO RELATED APPLICATION

This patent application claims the benefit of U.S. Provisional Patent Application No. 63/584,693, filed Sep. 22, 2023, which is incorporated by reference herein in its entirety.

BACKGROUND

Bed bugs are small parasitic, crawling insects that feed on the blood of animals. The common bed bug, *Cimex lectularius*, is adapted to living with humans and prefers feeding on human blood. Increase of international travel in recent decades has contributed to a resurgence of bed bugs in many new areas. Many aspects of bed bug biology makes their eradication difficult once they have established a presence in a location, including their tendency to hide, their ability to survive for long periods without food, their nocturnal nature, and their small size.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Bed bugs prefer to hide close to where they feed and typically find a shelter or hiding place, such as a small crack or crevice, in or around a bed or couch. The bugs may spend most of their time in hiding and only leave the shelter about once per week to feed. Bed bugs are mainly active during nighttime, making them hard to detect. Once established in a location, bed bugs tend to congregate but do not build nests like some other insects. Bed bugs can evade capture by many common means because they sense sticky surfaces with their front claws and reroute to avoid getting stuck, and bed bugs may refuse to take a step forward if they are not able to grip with their legs or extremities.

Because bed bugs can sense with their front extremities and may refuse to take a step forward if they are not able to grip with their extremities, many pitfall style traps fail to capture bed bugs, as the insects tend to move around the edge of the device yet not fall into the trap. The devices and methods discussed herein help to address these issues by including a pitfall trap that brings the insects beyond the point of no return and then leverages their behavior against them to deter their ability to leave the trap. Bed bugs will readily climb on paper and other textured or fibrous surfaces, so applying fibrous material onto an otherwise slippery pitfall trap that includes a slight downward angle into the trap side of the device can create a path that the bugs tend to follow but have difficulty escaping, resulting in capturing or falling into the trap. Though bed bugs are primarily discussed herein, the disclosure can apply to various other crawling insects.

The above discussion is intended to provide an overview of subject matter of the present patent application. It is not intended to provide an exclusive or exhaustive explanation of the invention. The description below is included to provide further information about the present patent application.

Figure 1:
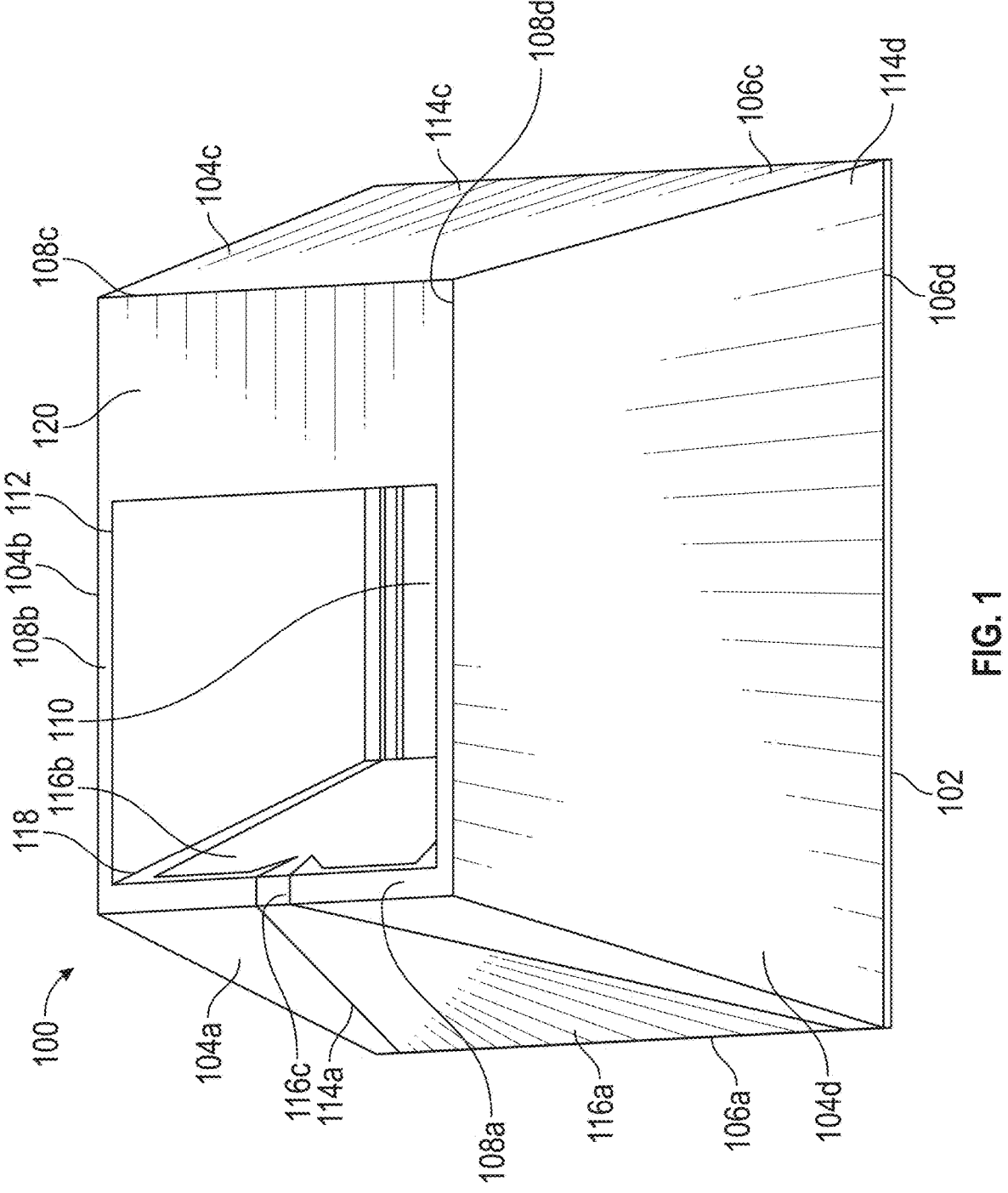
FIG. 1 illustrates an isometric view of an insect trap.
Figure 2:
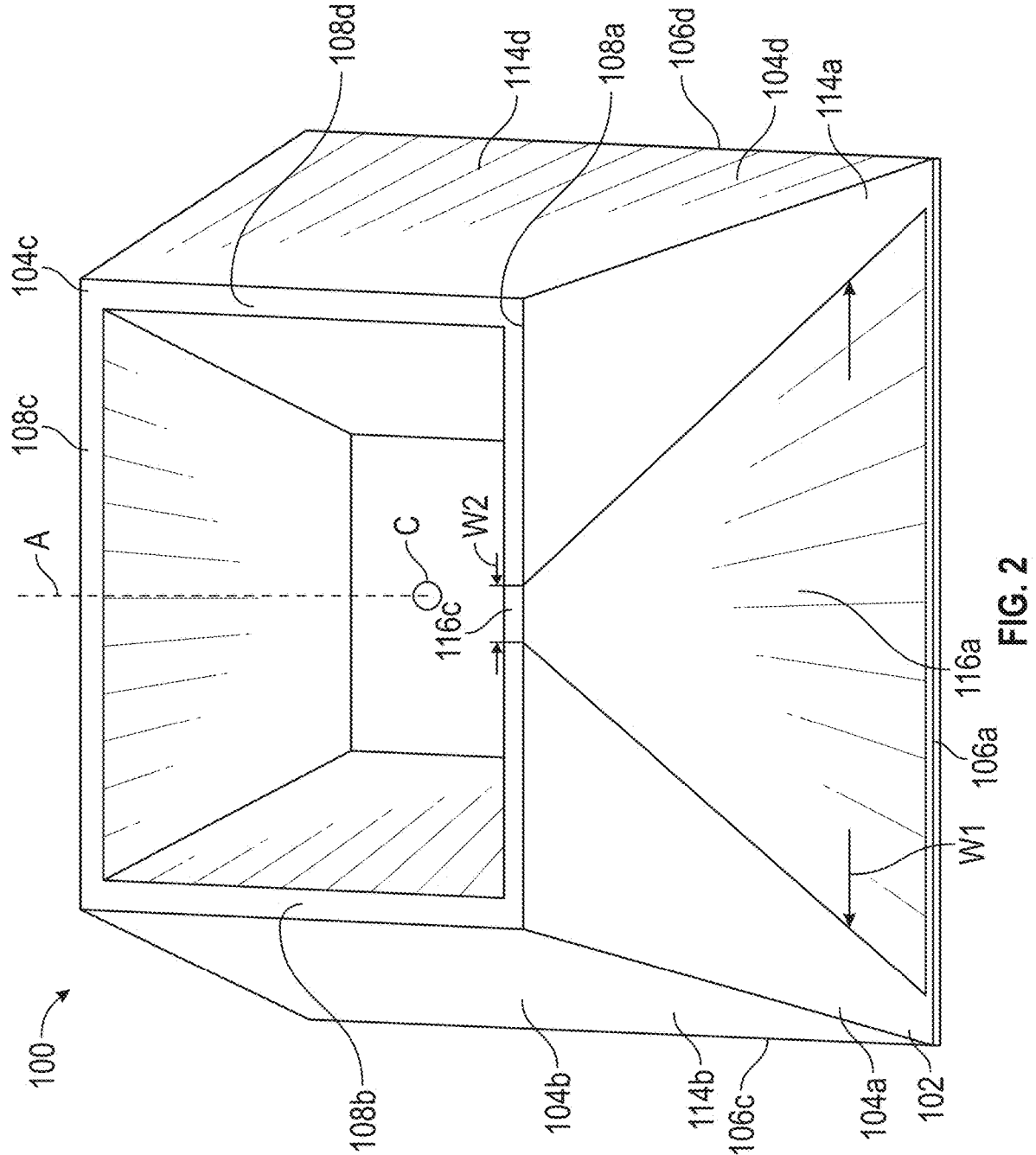
FIG. 2 illustrates an isometric view of an insect trap.

FIG. 1 illustrates an isometric view of an insect trap 100. FIG. 2 illustrates an isometric view of the insect trap 100. FIG. 2 also shows a center C and a central axis A. FIGS. 1 and 2 are discussed together below. The insect trap 100 can be a pitfall trap configured to attract and trap or contain insects, such as bed bugs. The insect trap 100 can include a base 102 and walls 104, such as a wall 104a, a wall 104b, a wall 104c, and a wall 104d. The base 102 can be open at the bottom or can be enclosed by the base 102. The base 102 can optionally include an adhesive layer to capture crawling insects or bugs. Though the insect trap 100 is shown as including four walls, the insect trap 100 can include 3, 5, 6, 7, 8, 9, 10, or the like walls.

The base 102 and the walls 104 can be arranged in a shape of a prism with an open top or partially open top. That is, the walls 104 can each extend from the base and can be sloped towards each other or angled inward toward the center C of the base 102 or toward the pitfall cavity 110 or toward the opening 112. The center C can optionally be a center of the walls or a center of the base of the walls. The walls 104 can be connected to each other to define a pitfall cavity 110, which can be an opening or void between the walls 104.

Each of the walls 104 can extend from a base 106 (e.g., bottom base) to an edge 108 (e.g., top edge). The bases 106 can optionally form the base 102. For example, the wall 104a can extend from a base 106a to a top edge 108a, the wall 104b can extend from a base 102b to a top edge 108b, the wall 104c can extend from a base 106c to a top edge 108c, and the wall 104d can extend from a base 106d to a top edge 108d. The walls 104 each extending from a base to a top edge can together define an opening 112 to the pitfall cavity 110. Though the walls are discussed as having a top and bottom, the insect trap 100 can be oriented or mounted in any direction such that the top and bottom become the sides or the like.

Each of the walls 104 can include an outer surface 114 (e.g., outer surfaces 114a, 114b, 114c, and 114d). The outer surface 114 of each of the walls 104 (e.g., a portion of the walls 104 that is exposed) can have or define a first coefficient of friction between 0.04 and 0.4. That is, the outer surfaces 114 of the walls 104 can be relatively smooth, polished, slick, low friction, or the like, such as to limit or dissuade movement or climbing or scaling of the insects across the outer surfaces 114 of the walls 104 that are uncovered, where climbing or scaling can include moving along a surface upwards, downwards, sideways, or a combination thereof.

The insect trap 100 can also include a fibrous layer 116 defining a wall portion 116a, a ledge portion 116b, and a track portion 116c. The fibrous layer 116 can be a layer adhered to (or otherwise secured or fastened) the outer surfaces 114a such that the fibrous layer 116 does not move (or significantly move, though its individual fibers may move) relative to the outer surfaces 114a. The outer surfaces 114b, 114c, and 114d can also have a fibrous layer applied thereto. The fibrous layer 116 can be a fibrous layer including fibers of cotton, nylon, wool, linen, silk, other polymers, cellulose fibers, paper fibers, wood fibers, or the like. The fibers can be of a shape and size to attract insects (e.g., bed bugs) for climbing or traversing such as to promote scaling or climbing of the crawling insects up the trap 100. Also, an outer surface of the fibrous layer have or define a second coefficient of friction that is higher than the first coefficient of friction.

The fibrous layer 116 (and any other fibrous portions discussed herein) can be replaced with a fibrous portion or fibrous surface. For example, any of the walls (e.g., outer surfaces 114b, 114c, and 114d) can include a fibrous or textured portion formed into the surface. For example, the surface(s) can be textured such as using chemical or mechanical texturing or etching to form the textured surface. The textured portions 116 can also be textured to include integral fibers or extensions of the surface simulating fibers for promoting climbing or scaling.

The insect trap 100 can also include a ledge 118 that can be connected to the top edge 108a of the wall 104a. The ledge 118 can extend at least partially over the pitfall cavity 110, toward the center C (or toward the bases 106) and toward an opposite wall or walls (e.g., away from the wall 104a). The ledge portion 116b can at least partially cover the ledge 118. The wall portion 116a can at least partially cover the outer surface of the wall 104a. The track portion 116c can cover at least a portion of an outer surface of the top edge 108a, such as a track.

The wall portion 116a of the fibrous layer 116 can define a wall layer width W1 that can decrease or reduce as the fibrous layer 116 extends from the first base 106a to the first top edge 108a of outer surfaces 114a of the wall 104a. The track portion 116b can be connected to the wall portion 116a and to the ledge portion 116b. The track portion 116c can traverse, cross, or cover, at least a portion of the top edge 108a. The track portion 116c can define a track width W2 that is smaller than a majority of the wall layer width. Optionally, the smallest width of the wall layer width W1 can be equal to the track width W2, such as where the wall portion 116a and the track portion 116c connect.

In operation of some examples, the insect trap 100 can be placed at or near a location where insects, e.g., bed bugs, are suspected to be or where they may be likely to nest, such as a floor or table surface. The fibrous layer 116 can form an attractive or interesting path for the bed bugs or insects to travel as the insects climb the wall portion 116a, while the smooth surfaces of a remainder of the wall portion 116a (or other walls) can dissuade movement off the wall portion 116a (i.e., off the fibrous layer 116). The wall portion 116a can narrow (e.g., decrease in width W1) as the wall portion 116a approaches the top edge 108a, helping to guide the insects toward the ledge 118. As the insects reach the track portion 116c, they can cross the relatively narrow track or track portion 116c to the ledge 118, and specifically to the ledge portion 116b of the fibrous layer 116. The ledge 118 can be at a relatively steep angle (e.g., toward the center C or toward the opening 112 or the pitfall cavity 110), such that the insects or bed bugs, can easily fall into the pitfall cavity 110 after tiring or becoming lost on the fibrous layer 116. This can be due to the specific geometry features used to help make the bed bugs or insects lost, trapped, or immobilized, resulting in tired bugs that can fall into the pitfall cavity 110 for capture or any harboring bugs remaining on fibrous layer 116 to be discovered to that treatments can be administered.

The insect trap 100 can also include a cover 120 that can be connected to one or more of the walls 104 such as to one or more of the edges 108. For example, the cover 120 can connect to the top edge 108b, the top edge 108c, and the top edge 108d, across from the ledge 118. The cover 120 can help prevent or limit bed bugs or insects from escaping the pitfall cavity 110 after capture. Further details of the insect trap 100 are discussed below.

Figure 3:
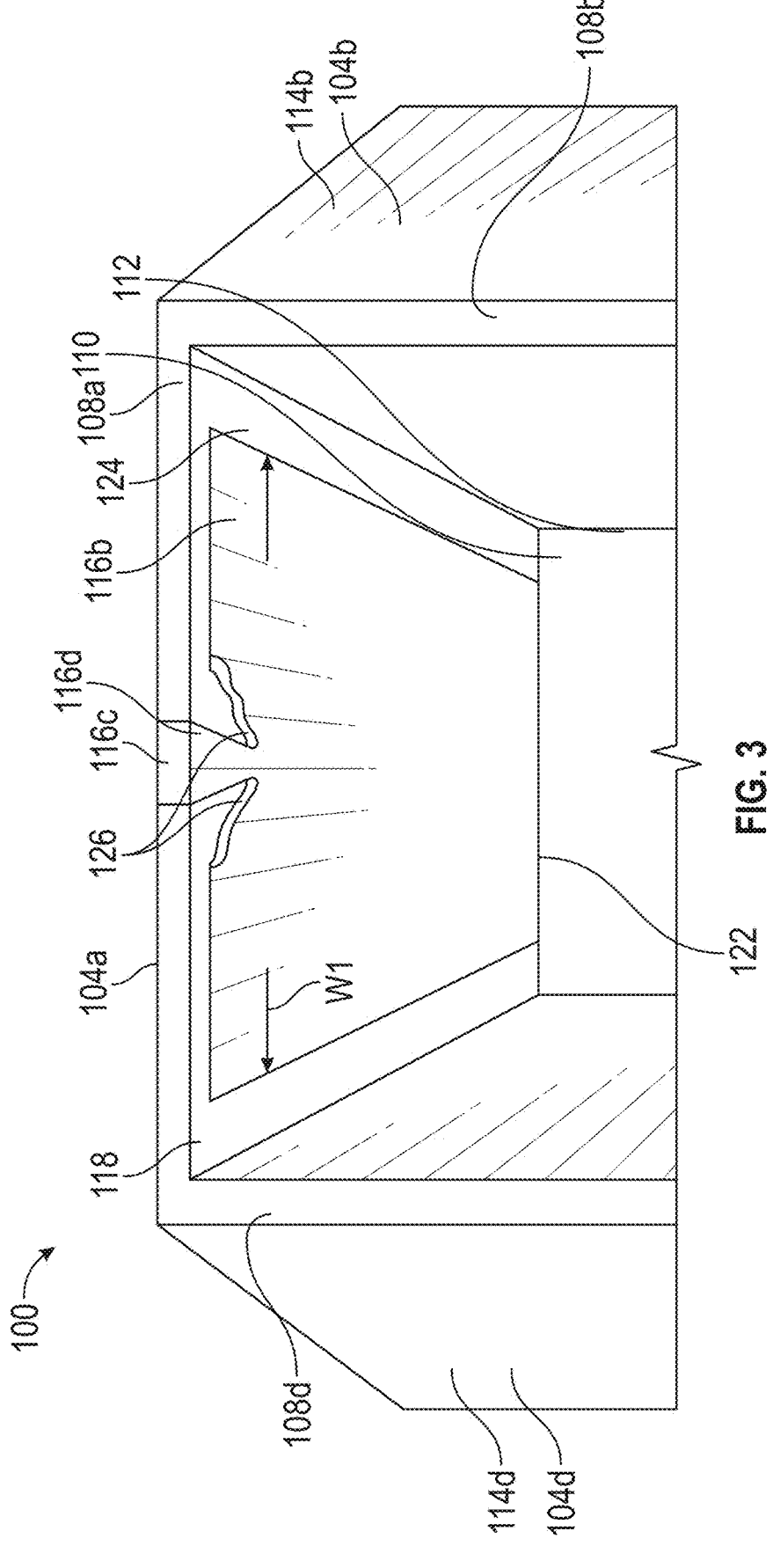
FIG. 3 illustrates an isometric view of a portion of an insect trap.

FIG. 3 illustrates an isometric view of a portion of the insect trap 100. The insect trap 100 can be consistent with the insect trap 100 of FIGS. 1 and 2 discussed above. FIG. 3 shows that the insect trap 100 can include an adhesive layer or bead. Any of the traps discussed above or below can include such an adhesive layer.

More specifically, the fibrous layer 116 can include a wedge portion 116d connected to the track portion 116c and connected to the ledge portion 116b. The wedge portion 116d can have a shape of an inverted pyramid or triangle, decreasing in width as the wedge portion 116d extends down the ledge 118, eventually connecting to the ledge portion 116b, which can have a larger width W3 that decreases as the ledge 118 extends toward an edge 122 of the ledge 118 and toward the plane defined by the bases 106. The ledge portion 116b can be surrounded by smooth portions of an outer surface 124 of the ledge 118.

The insect trap 100 can also include an adhesive layer 126, which can be an adhesive bead, adhesive layer, or adhesive in some form applied around an upper portion of a perimeter or periphery of the ledge portion 116b, such as around where the wedge portion 116d connects to the ledge portion 116b. The adhesive bead or layer 126 can act as a deterrent to the insects or bed bugs from backtracking once they are located on the ledge portion 116b.

That is, as the insects or bed bugs are guided by the track portion 116c up over the top edge 108a and onto the wedge portion 116d, the wedge portion 116d can reduce in width to lead the insects onto the ledge portion 116b of the fibrous layer 116 on the ledge 118. The ledge portion 116b can be much larger in size to allow the insects to roam or move on the wedge portion 116d, but as the ledge portion 116b is surrounded by smooth surface of the outer surface 124, the insects are continually guided toward the edge 122 of the ledge 118. The adhesive layer 126 can help to guide the insects away from the return path through the wedge portion 116d to help urge the insects toward the edge 122 and into the pitfall cavity 110.

Figure 4:
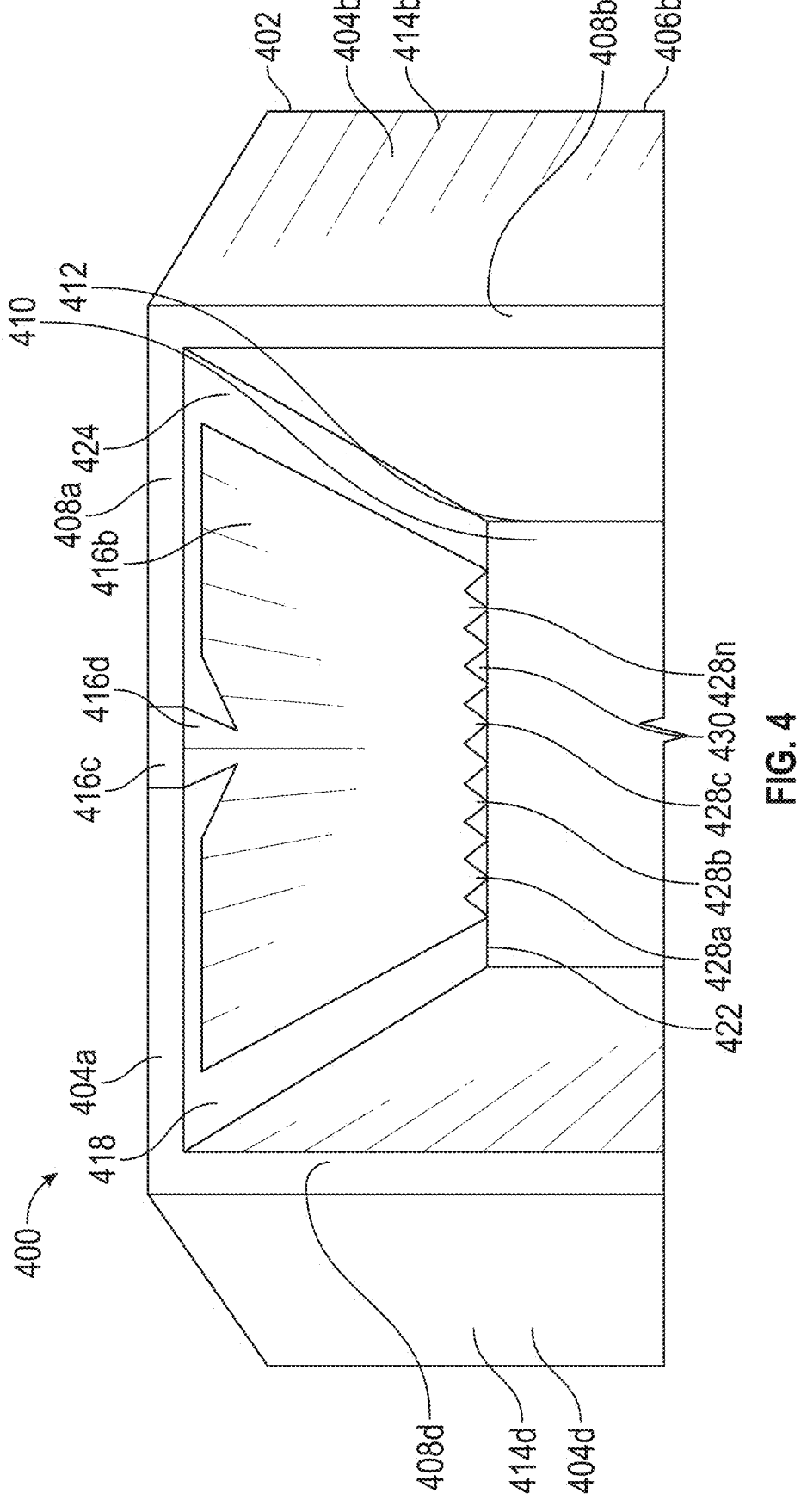
FIG. 4 illustrates an isometric view of portion of an insect trap.

FIG. 4 illustrates an isometric view of portion of an insect trap 400. The insect trap 400 can be similar to the insect trap 100 discussed above. The insect trap 400 can include a ledge having projections or protrusions such as teeth. Any of the traps discussed above or below can include the features of the insect trap 400.

The insect trap 400 can include a base 402, walls 404 (e.g., walls 404a-404d), bases 406 (e.g., bases 406a-406d), top edges 408 (e.g., edges 408a-408d), a pitfall cavity 410, an opening 412. The walls 404 can include outer surfaces 414. The insect trap 400 can also include a fibrous layer 416 including a wall portion 416a, a ledge portion 416b, a track portion 416c, and a wedge portion 416d. Such components of the insect trap 400 can be similarly connected to similarly numbered components of the insect trap 100.

The insect trap 400 can also include a ledge 418 connected to the top edge 408a, which can extend toward a center of the walls 404 and down toward the bases 406. The ledge 418 can terminate at an edge 422 that can be located above the pitfall cavity 410. The ledge 418 can include an outer surface 424 and can also include projections 428a-428n (e.g., a plurality of teeth). The projections 428 can be projections from the ledge 418 that can extend over the pitfall cavity 410. The projections 428 can be covered by the ledge portion 416b of the fibrous layer 416 such as to promote insects moving to an edge over the pitfall cavity 410 having a smaller surface area to help increase likelihood of capture. The spaces 430 can be gaps or holes located between adjacent projections 428 to help insects fall into the pitfall cavity 410. Optionally, the spaces 430 can be smooth or polished (or low friction surfaces) between the projections 428.

Figure 5:
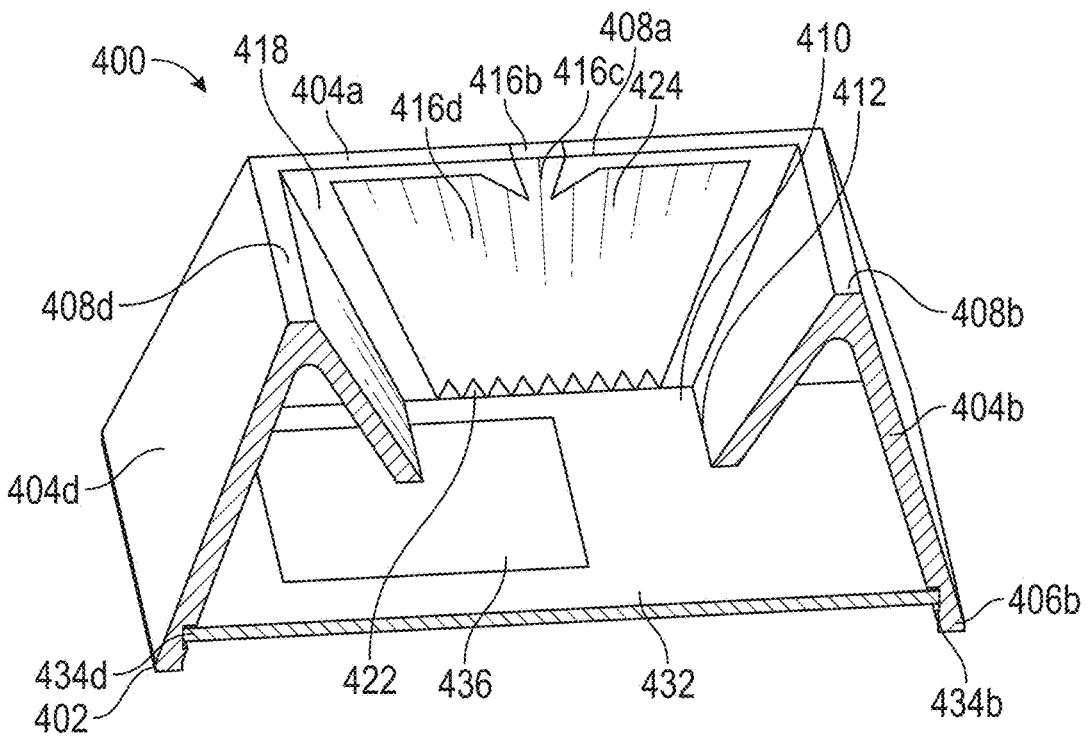
FIG. 5 illustrates an isometric cross-sectional view of a portion of an insect trap.
Figure 6:
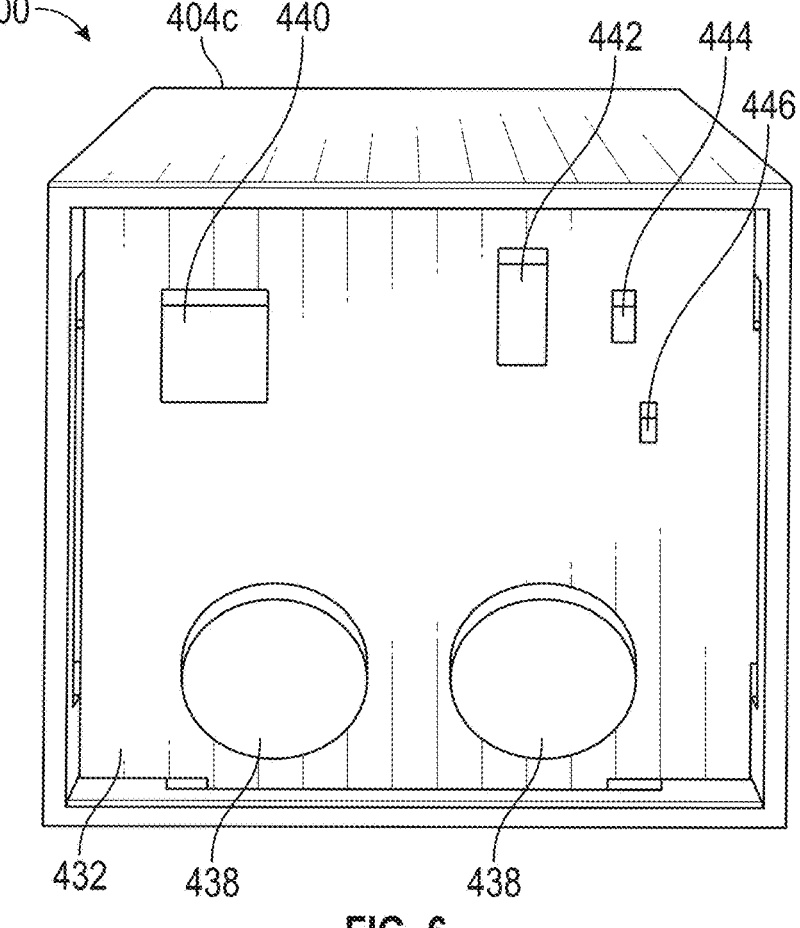
FIG. 6 illustrates a bottom view of a portion of an insect trap.

FIG. 5 illustrates an isometric cross-sectional view of a portion of the insect trap 400. FIG. 6 illustrates a bottom view of a portion of the insect trap 400. The 400 can be consistent with the insect trap 400 of FIG. 4 discussed above. FIGS. 5 and 6 show that the insect trap 400 can include a control board 432. Any of the traps discussed above or below can include the features of the insect trap 400.

The walls 404 can each include a notch or recess 434. For example, as shown in FIG. 5, the wall 404b can include a notch 434b and the wall 404d can include a notch 434d. Edges of the board 432 can be positioned into the notches 434 to hold or retain the board 432. The control board 432 can be a programable controller, such as a single or multi-board computer, a direct digital controller (DDC), a programable logic controller (PLC), or the like.

As shown in FIG. 5, the control board 432 can include a sensor 436, which can be one or more sensors configured to generate a signal based on a presence of one or more bed bugs within the pitfall cavity 410. For example, the sensor 436 can be an inductive sensor, a capacitive sensor, an optical sensor, an ultrasonic sensor, or the like. As shown in FIG. 6, the control board 432 can include one or more capacitors 438, such as to supply power to the sensor 436 and to a processor 440. The processor 440 can be connected to memory 442, which can include short term or long term memory, as discussed further below. The control board 432 can also include one or more switches 444, such as for enabling and disabling power or other features of the control board 432. The control board 432 can also include one or more antennas or transceivers 446 for sending or receiving data.

In operation, the controller 432 (e.g., the processor 440) can be configured to generate an alert based on the signal from the sensor 436 upon detection of an insect. The processor 440 can transmit the alert to the transceiver 446, which can transmit the alert to one or more external device, such as a smartphone or a network for indication that one or more insects has fallen into the pitfall cavity 410.

Figure 7:
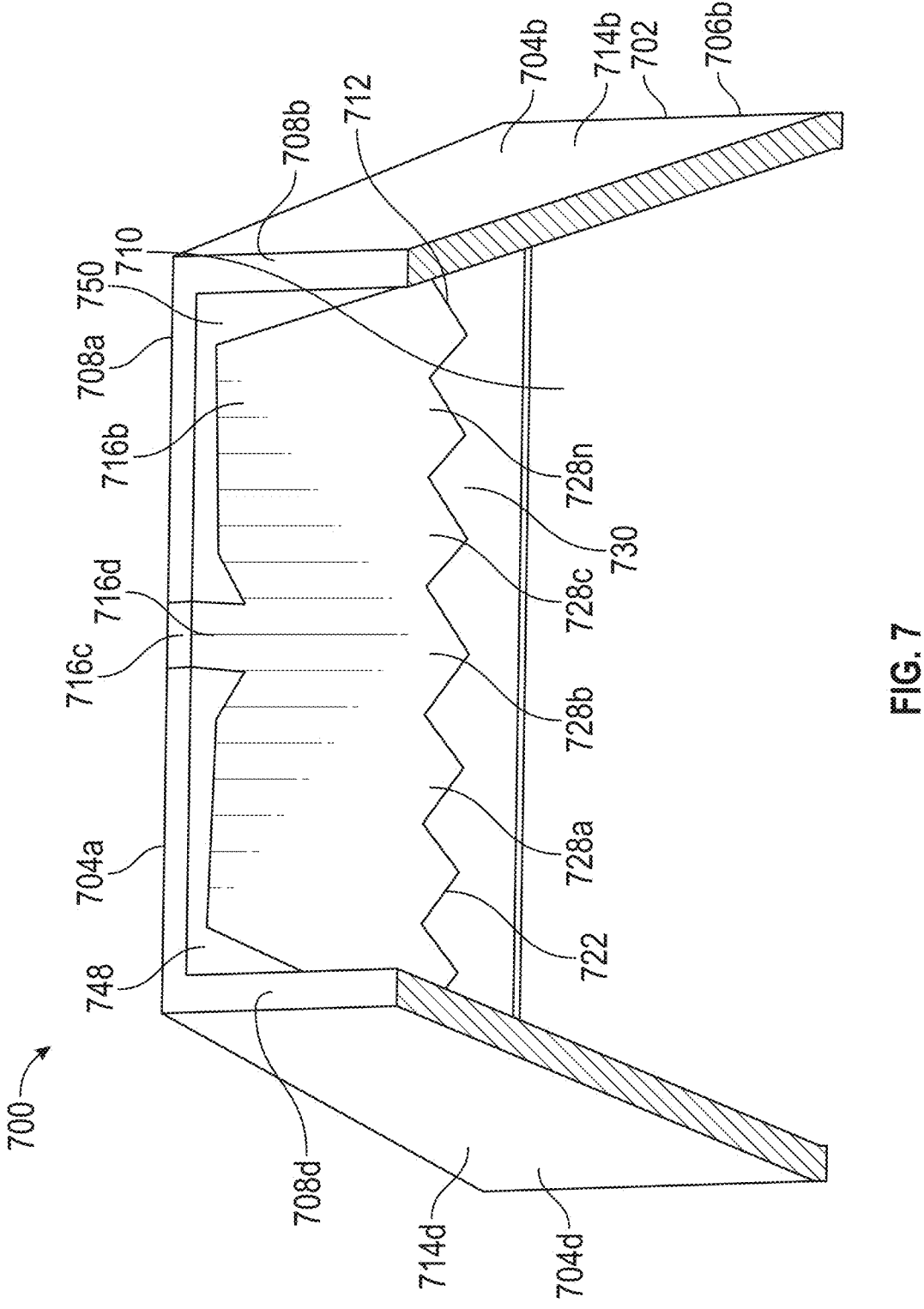
FIG. 7 illustrates an isometric view of portion of an insect trap.

FIG. 7 illustrates an isometric view of portion of an insect trap 700. The insect trap 700 can be similar to the insect trap 100 discussed above. The insect trap 700 can have no ledge such that the fibrous material is wrapped around the wall. Any of the traps discussed above or below can include the features of the insect trap 700.

The insect trap 700 can include a base 702, walls 704, bases 706, top edges 708, a pitfall cavity 710, an opening 712. The walls 704 can include outer surfaces 714. The insect trap 700 can also include a fibrous layer 716 including a wall portion 716a, a ledge portion 716b, a track portion 716c, and a wedge portion 716d. The fibrous layer 716 can be wrapped around the wall 704a such that the fibrous layer 716 is applied to a back portion 748 of the wall 704a, which can include an outer surface 750 that is relatively smooth or has a low friction coefficient. Such a configuration can force insects traveling on the fibrous layer 716 to cross over the track portion 716c and travel downward along a back side of the wall 704a, which can increase tiring of the insects and therefore falling of the insects into the pitfall cavity 710.

Figure 8:
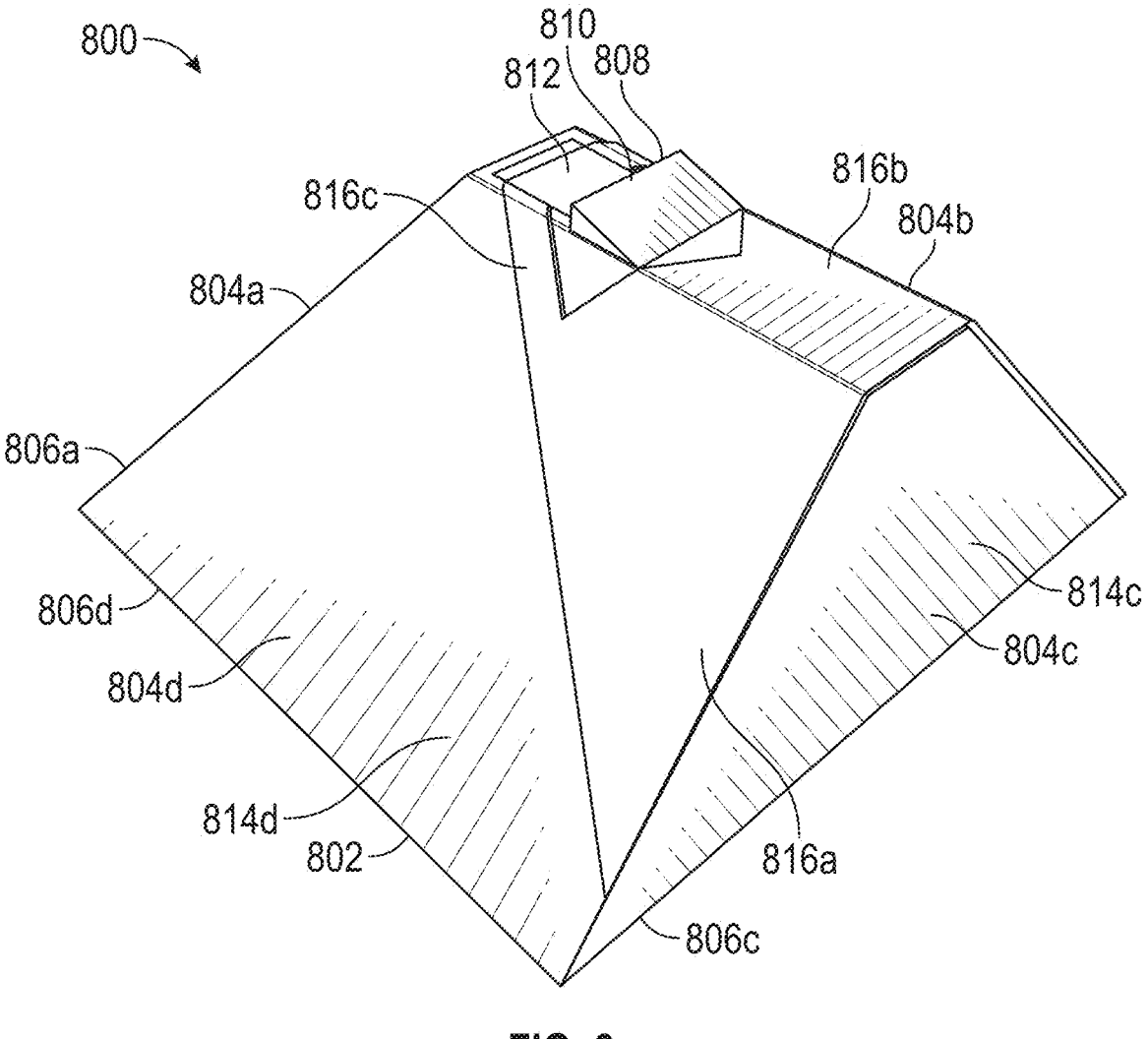
FIG. 8 illustrates an isometric view of portion of an insect trap.

FIG. 8 illustrates an isometric view of portion of an insect trap 800. The insect trap 800 can be similar to the insect traps discussed above. The insect trap 800 can include a second base or flat portion allowing the insect trap 800 to be positioned in multiple orientations while still operating effectively. The insect trap 800 can also include a funnel trap on an inner or outer surface of the trap. Any of the traps discussed above or below can include the features of the insect trap 800.

The insect trap 800 can include a base 802 (e.g., formed by bases 106), walls 804, top edges 808, a pitfall cavity 810, and an opening 812. The walls 804 can include outer surfaces 814 (e.g., 814a-814d). The insect trap 800 can also include a fibrous layer 816 including a wall portion 816a, a ledge portion 816b, and a track portion 816c. The fibrous layer 816 can be wrapped around at least a portion of one or more wall 804, such as from the wall 804c to the ledge 816b, such that the fibrous layer 816. Such a configuration can force insects traveling on the fibrous layer 816 to cross travel to and over the track portion 816c and travel into the pitfall cavity 810.

The insect trap 800 can also include one or more walls that can be configured to be used as a base. For example, the wall 804c can be configured to be used as a base such that the wall 804c rests on a floor or other surface to support the insect trap 800. This can allow the insect trap 800 to be used in multiple configurations or to be placed in various places within an environment, such as near walls, furniture, or the like.

Figure 9:
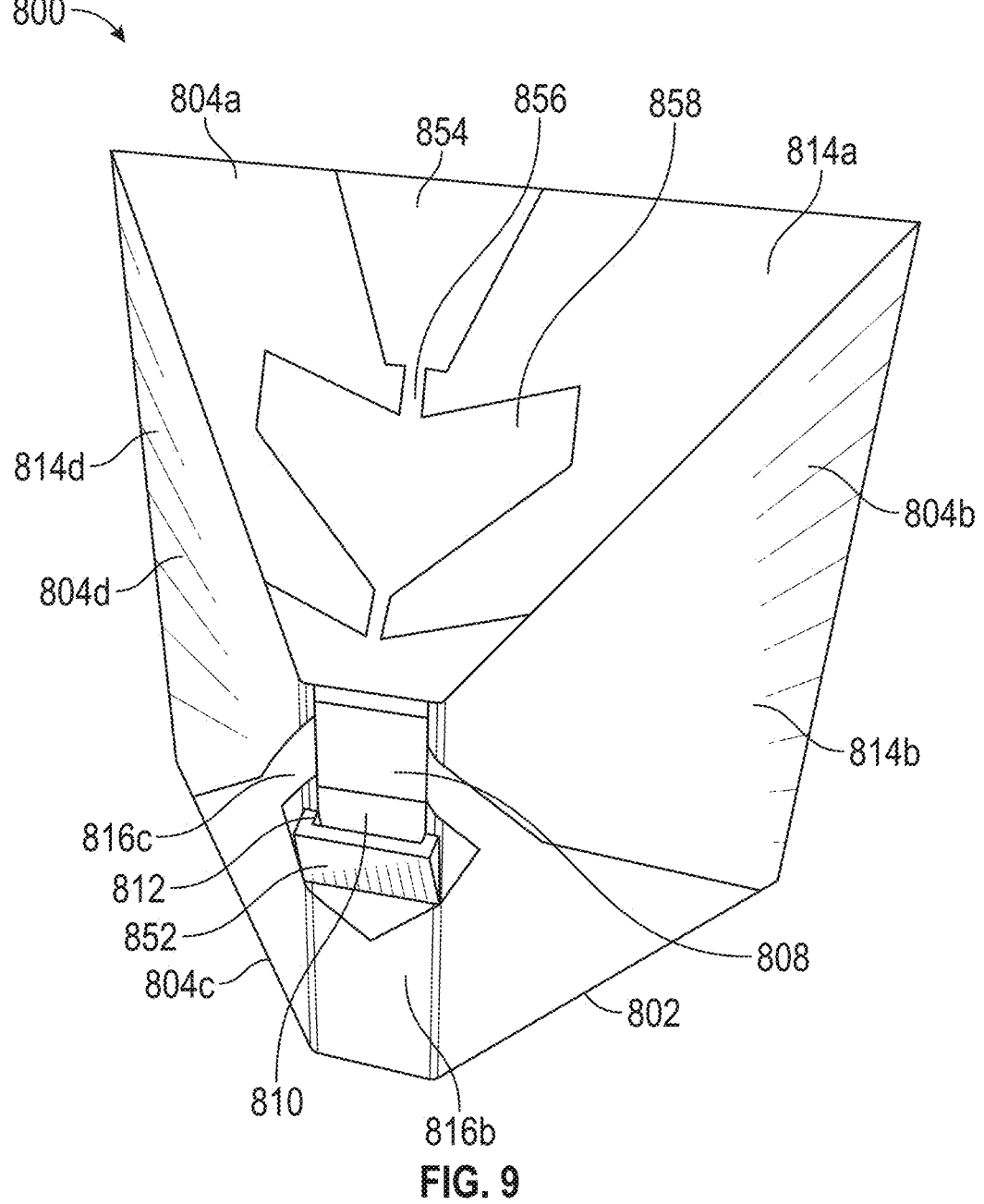
FIG. 9 illustrates an isometric view of portion of an insect trap.

FIG. 9 illustrates an isometric view of portion of the insect trap 900. The insect trap 800 can be consistent with the insect trap 800 discussed above with regard to FIG. 8. FIG. 9 shows the insect trap 800 in a different configuration.

More specifically, FIG. 9 shows the insect trap 800 positioned or oriented such that the wall 804c can be or can for a base for the insect trap 800. In such a configuration or orientation, the insects can be induced to climb the fibrous layer that can be applied to a top portion of the insect trap 800 including the ledge portion 816b and the track portion 816c, such as to direct the insects towards the pitfall cavity 810. The insect trap 800 can optionally include a hood 852 connected to the track 816 to at least partially cover the pitfall cavity 810 and opening 812, which can help ensure the insects fall into the pitfall cavity 810 and not off of the fibrous layer 816 and back into the environment.

FIG. 9 also shows that the outer surface 814a can include a fibrous layer 854 that can connect to an edge of the wall 804a, such that a bottom edge of the fibrous layer 854 is near the base 802, such that when the insect trap 800 in the configuration shown in FIG. 8, the bottom edge of the fibrous layer 854 is at the base 802. The fibrous layer 854 can be similar to any of the fibrous layers discussed above, such as including fibers to promote climbing or scaling of insects. The fibrous layer 854 can also be patterned or shaped to help prevent insects from double back or reversing course down the wall 804*a*, such as by including relatively small tracks 856 and relatively wide catches 856, which can, together, help to promote movement or climbing of the bugs towards the opening 812 of the pitfall cavity 810. The insect trap 800 can include the fibrous layer 854 on one or more of the outer surfaces 814 and can optionally include the fibrous layer 854 in the shown pattern or other patterns on the inside of the insect trap 800 or on an outer surface of the insect trap 800.

Figure 10:
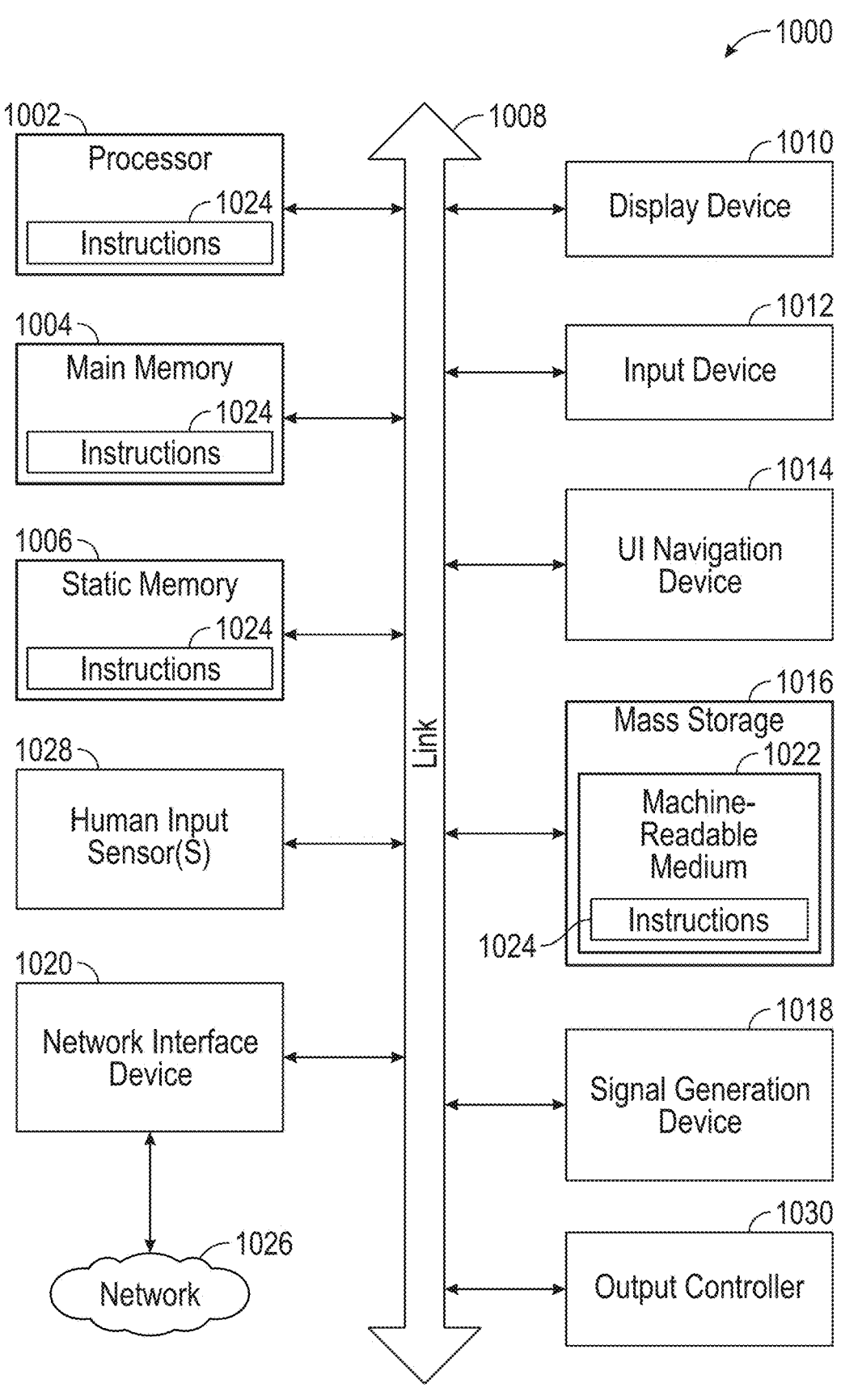
FIG. 10 illustrates a block diagram illustrating an example of a machine upon which one or more embodiments may be implemented.

FIG. 10 illustrates a block diagram of an example machine 1000 upon which any one or more of the techniques (e.g., methodologies) discussed herein may perform. Examples, as described herein, may include, or may operate by, logic or a number of components, or mechanisms in the machine 1000. Circuitry (e.g., processing circuitry) is a collection of circuits implemented in tangible entities of the machine 1000 that include hardware (e.g., simple circuits, gates, logic, etc.). Circuitry membership may be flexible over time. Circuitries include members that may, alone or in combination, perform specified operations when operating. In an example, hardware of the circuitry may be immutably designed to carry out a specific operation (e.g., hardwired). In an example, the hardware of the circuitry may include variably connected physical components (e.g., execution units, transistors, simple circuits, etc.) including a machine readable medium physically modified (e.g., magnetically, electrically, moveable placement of invariant massed particles, etc.) to encode instructions of the specific operation. In connecting the physical components, the underlying electrical properties of a hardware constituent are changed, for example, from an insulator to a conductor or vice versa. The instructions enable embedded hardware (e.g., the execution units or a loading mechanism) to create members of the circuitry in hardware via the variable connections to carry out portions of the specific operation when in operation. Accordingly, in an example, the machine readable medium elements are part of the circuitry or are communicatively coupled to the other components of the circuitry when the device is operating. In an example, any of the physical components may be used in more than one member of more than one circuitry. For example, under operation, execution units may be used in a first circuit of a first circuitry at one point in time and reused by a second circuit in the first circuitry, or by a third circuit in a second circuitry at a different time. Additional examples of these components with respect to the machine 1000 follow.

In alternative embodiments, the machine 1000 may operate as a standalone device or may be connected (e.g., networked) to other machines. In a networked deployment, the machine 1000 may operate in the capacity of a server machine, a client machine, or both in server-client network environments. In an example, the machine 1000 may act as a peer machine in peer-to-peer (P2P) (or other distributed) network environment. The machine 1000 may be a personal computer (PC), a tablet PC, a set-top box (STB), a personal digital assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

The machine (e.g., computer system) 1000 may include a hardware processor 1002 (e.g., a central processing unit (CPU), a graphics processing unit (GPU), a hardware processor core, or any combination thereof), a main memory 1004, a static memory (e.g., memory or storage for firmware, microcode, a basic-input-output (BIOS), unified extensible firmware interface (UEFI), etc.) 1006, and mass storage 1008 (e.g., hard drive, tape drive, flash storage, or other block devices) some or all of which may communicate with each other via an interlink (e.g., bus) 1030. The machine 1000 may further include a display unit 1010, an alphanumeric input device 1012 (e.g., a keyboard), and a user interface (UI) navigation device 1014 (e.g., a mouse). In an example, the display unit 1010, input device 1012 and UI navigation device 1014 may be a touch screen display. The machine 1000 may additionally include a storage device (e.g., drive unit) 1008, a signal generation device 1018 (e.g., a speaker), a network interface device 1020, and one or more sensors 1016, such as a global positioning system (GPS) sensor, compass, accelerometer, or other sensor. The machine 1000 may include an output controller 1028, such as a serial (e.g., universal serial bus (USB), parallel, or other wired or wireless (e.g., infrared (IR), near field communication (NFC), etc.) connection to communicate or control one or more peripheral devices (e.g., a printer, card reader, etc.).

Registers of the processor 1002, the main memory 1004, the static memory 1006, or the mass storage 1008 may be, or include, a machine readable medium 1022 on which is stored one or more sets of data structures or instructions 1024 (e.g., software) embodying or utilized by any one or more of the techniques or functions described herein. The instructions 1024 may also reside, completely or at least partially, within any of registers of the processor 1002, the main memory 1004, the static memory 1006, or the mass storage 1008 during execution thereof by the machine 1000. In an example, one or any combination of the hardware processor 1002, the main memory 1004, the static memory 1006, or the mass storage 1008 may constitute the machine readable media 1022. While the machine readable medium 1022 is illustrated as a single medium, the term "machine readable medium" may include a single medium or multiple media (e.g., a centralized or distributed database, and/or associated caches and servers) configured to store the one or more instructions 1024.

The term "machine readable medium" may include any medium that is capable of storing, encoding, or carrying instructions for execution by the machine 1000 and that cause the machine 1000 to perform any one or more of the techniques of the present disclosure, or that is capable of storing, encoding or carrying data structures used by or associated with such instructions. Non-limiting machine readable medium examples may include solid-state memories, optical media, magnetic media, and signals (e.g., radio frequency signals, other photon based signals, sound signals, etc.). In an example, a non-transitory machine readable medium comprises a machine readable medium with a plurality of particles having invariant (e.g., rest) mass, and thus are compositions of matter. Accordingly, non-transitory machine-readable media are machine readable media that do not include transitory propagating signals. Specific examples of non-transitory machine readable media may include: non-volatile memory, such as semiconductor memory devices (e.g., Electrically Programmable Read- Only Memory (EPROM), Electrically Erasable Programmable Read-Only Memory (EEPROM)) and flash memory devices; magnetic disks, such as internal hard disks and removable disks; magneto-optical disks; and CD-ROM and DVD-ROM disks.

The instructions 1024 may be further transmitted or received over a communications network 1026 using a transmission medium via the network interface device 1020 utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, peer-to-peer (P2P) networks, among others. In an example, the network interface device 1020 may include one or more physical jacks (e.g., Ethernet, coaxial, or phone jacks) or one or more antennas to connect to the communications network 1026. In an example, the network interface device 1020 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding or carrying instructions for execution by the machine 1000, and includes digital or analog communications signals or other intangible medium to facilitate communication of such software. A transmission medium is a machine readable medium.

NOTES AND EXAMPLES

The following, non-limiting examples, detail certain aspects of the present subject matter to solve the challenges and provide the benefits discussed herein, among others.

Example 1 is a crawling insect pitfall trap to be placed on a surface, the pitfall trap comprising: a plurality of connected walls, the plurality of connected walls configured to rest on the surface, the plurality of connected walls each sloped to form a pitfall cavity and to form a top edge at an opening of the pitfall cavity, the plurality of connected walls each including an outer surface that is smooth, the sloped and smooth surfaces of the plurality of connected walls configured to dissuade climbing by a crawling insect; and a fibrous layer applied to at least a portion of an outer surface of at least one wall of the plurality of connected walls, the fibrous layer extending from about where the at least one wall rests on the surface to the top edge of the at least one wall, and the fibrous layer including a fibrous outer surface, the fibrous layer configured to promote climbing by the crawling insect.

In Example 2, the subject matter of Example 1 optionally includes wherein a first width of the fibrous layer at about the surface is less than a second width of the fibrous layer at about the top edge.

In Example 3, the subject matter of any one or more of Examples 1-2 optionally include wherein the top edge has a ledge extending at least partially into the pitfall cavity and the fibrous layer includes a ledge portion covering at least a portion of an outer surface of the ledge.

In Example 4, the subject matter of Example 3 optionally includes wherein the fibrous layer includes a track portion connected to the fibrous layer on the at least one wall and the ledge portion, the track portion traversing the top edge, and the track portion defining a track width that is smaller than a majority of a wall layer width of the fibrous layer on the at least one wall.

In Example 5, the subject matter of Example 4 optionally includes wherein the ledge portion is wider than the track width and decreases in width as the ledge extends downward into the pitfall cavity.

In Example 6, the subject matter of Example 5 optionally includes an adhesive layer applied to the ledge near the track portion and around at least a portion of a periphery of the ledge portion of the fibrous layer.

In Example 7, the subject matter of Example 6 optionally includes wherein the ledge includes a plurality of protrusions extending toward the pitfall cavity, the ledge portion of the fibrous layer covering at least a portion of one or more of the protrusions.

In Example 8, the subject matter of any one or more of Examples 6-7 optionally include wherein the ledge includes a plurality of protrusions extending toward the pitfall cavity, the fibrous layer covering at least a portion of one or more of the protrusions.

In Example 9, the subject matter of any one or more of Examples 1-8 optionally include wherein the plurality of connected walls form a truncated pyramid.

In Example 10, the subject matter of any one or more of Examples 1-9 optionally include a sensor located within the pitfall cavity and configured to generate a signal based on a presence of one or more crawling insects within the pitfall cavity; and a controller configured to generate an alert based on the signal.

Example 11 is a crawling insect pitfall trap comprising: a plurality of walls connected to each other, the plurality of walls each extending from a base to a top edge to together define an opening to a pitfall cavity, one or more of the plurality of walls sloped towards the opening, and the plurality of walls each including an outer surface; and a fibrous or textured portion of an outer surface of one or more of the plurality of walls, the fibrous or textured portion extending from the base to the top edge of respective ones of the one or more of the plurality of walls, and the fibrous or textured portion including a fibrous outer surface.

In Example 12, the subject matter of Example 11 optionally includes wherein the outer surface of each of the plurality of walls that is exposed is smooth or polished to dissuade climbing thereof by a crawling insect.

In Example 13, the subject matter of Example 12 optionally includes the fibrous or textured portion is configured to promote climbing by the crawling insect.

In Example 14, the subject matter of any one or more of Examples 11-13 optionally include wherein the fibrous or textured portion defines a wall portion width that decreases as the fibrous or textured portion extend from a first base to a first top edge of a first outer surface of a first wall of the plurality of walls.

In Example 15, the subject matter of Example 14 optionally includes a ledge connected to the first top edge, the ledge extending at least partially over the pitfall cavity, toward the opening, and toward a plane defined by the bases; wherein the fibrous or textured portion includes a wall portion covering the outer surface of the first wall, and wherein the fibrous or textured portion includes a ledge portion covering at least a portion of an outer surface of the ledge, the ledge portion connected to the wall portion.

In Example 16, the subject matter of Example 15 optionally includes wherein the fibrous or textured portion defines a track portion connected to the wall portion and the ledge portion, the track portion traversing the top edge, and the track portion defining a track width that is smaller than a majority of the wall portion width.

In Example 17, the subject matter of Example 16 optionally includes wherein the ledge portion defines a width that is larger than the track width and decreases as the ledge extends toward the plane defined by the bases.

In Example 18, the subject matter of Example 17 optionally includes an adhesive portion applied to the ledge near the track portion and around at least a portion of a periphery of the ledge portion of the fibrous or textured portion.

In Example 19, the subject matter of any one or more of Examples 17-18 optionally include wherein the ledge includes a plurality of teeth extending over the pitfall cavity, the ledge portion of the fibrous or textured portion covering at least a portion of one or more of the teeth.

In Example 20, the subject matter of any one or more of Examples 15-19 optionally include wherein the ledge includes a plurality of teeth extending over the pitfall cavity, the fibrous or textured portion covering at least a portion of one or more of the teeth.

In Example 21, the apparatuses or method of any one or any combination of Examples 1-20 can optionally be configured such that all elements or options recited are available to use or select from.

The above detailed description includes references to the accompanying drawings, which form a part of the detailed description. The drawings show, by way of illustration, specific embodiments in which the invention can be practiced. These embodiments are also referred to herein as "examples." Such examples can include elements in addition to those shown or described. However, the present inventors also contemplate examples in which only those elements shown or described are provided. Moreover, the present inventors also contemplate examples using any combination or permutation of those elements shown or described (or one or more aspects thereof), either with respect to a particular example (or one or more aspects thereof), or with respect to other examples (or one or more aspects thereof) shown or described herein.

In the event of inconsistent usages between this document and any documents so incorporated by reference, the usage in this document controls. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The above description is intended to be illustrative, and not restrictive. For example, the above-described examples (or one or more aspects thereof) may be used in combination with each other. Other embodiments can be used, such as by one of ordinary skill in the art upon reviewing the above description. The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The scope of the invention should be determined with reference to the appended claims, along with the full scope of equivalents to which such claims are entitled.

The invention claimed is:

1. A crawling insect pitfall trap to be placed on a surface, the pitfall trap comprising:
    a plurality of connected walls, the plurality of connected walls configured to rest on the surface, the plurality of connected walls each sloped to form a pitfall cavity and to form a top edge at an opening of the pitfall cavity, the plurality of connected walls each including an outer surface that is smooth, the sloped and smooth surfaces of the plurality of connected walls configured to dissuade climbing by a crawling insect; and
    a fibrous layer applied to at least a portion of an outer surface of at least one wall of the plurality of connected walls, the fibrous layer extending from about where the at least one wall rests on the surface to the top edge of the at least one wall, and the fibrous layer including a fibrous outer surface, the fibrous layer configured to promote climbing by the crawling insect.

2. The crawling insect pitfall trap of claim 1, wherein a first width of the fibrous layer at about the surface is less than a second width of the fibrous layer at about the top edge.

3. The crawling insect pitfall trap of claim 1, wherein the top edge has a ledge extending at least partially into the pitfall cavity and the fibrous layer includes a ledge portion covering at least a portion of an outer surface of the ledge.

4. The crawling insect pitfall trap of claim 3, wherein the fibrous layer includes a track portion connected to the fibrous layer on the at least one wall and the ledge portion, the track portion traversing the top edge, and the track portion defining a track width that is smaller than a majority of a wall layer width of the fibrous layer on the at least one wall.

5. The crawling insect pitfall trap of claim 4, wherein the ledge portion is wider than the track width and decreases in width as the ledge extends downward into the pitfall cavity.

6. The crawling insect pitfall trap of claim 5, comprising:
    an adhesive layer applied to the ledge near the track portion and around at least a portion of a periphery of the ledge portion of the fibrous layer.

7. The crawling insect pitfall trap of claim 6, wherein the ledge includes a plurality of protrusions extending toward the pitfall cavity, the ledge portion of the fibrous layer covering at least a portion of one or more of the protrusions.

8. The crawling insect pitfall trap of claim 6, wherein the ledge includes a plurality of protrusions extending toward the pitfall cavity, the fibrous layer covering at least a portion of one or more of the protrusions.

9. The crawling insect pitfall trap of claim 1, wherein the plurality of connected walls form a truncated pyramid.

10. The crawling insect pitfall trap of claim 1, comprising:

a sensor located within the pitfall cavity and configured to generate a signal based on a presence of one or more crawling insects within the pitfall cavity; and a controller configured to generate an alert based on the signal.

11. A crawling insect pitfall trap comprising:

a plurality of walls connected to each other, the plurality of walls each extending from a base to a top edge to together define an opening to a pitfall cavity, one or more of the plurality of walls sloped towards the opening, and the plurality of walls each including an outer surface that is smooth, the sloped and smooth surfaces configured to deter climbing by a crawling insect; and a fibrous or textured portion of an outer surface of one or more of the plurality of walls, the fibrous or textured portion extending from the base to the top edge of respective ones of the one or more of the plurality of walls, and the fibrous or textured portion including a fibrous outer surface.

12. The crawling insect pitfall trap of claim 11, the fibrous or textured portion is configured to promote climbing by the crawling insect.

13. The crawling insect pitfall trap of claim 11, wherein the fibrous or textured portion defines a wall portion width that decreases as the fibrous or textured portion extend from a first base to a first top edge of a first outer surface of a first wall of the plurality of walls.

14. The crawling insect pitfall trap of claim 13, comprising:

a ledge connected to the first top edge, the ledge extending at least partially over the pitfall cavity, toward the opening, and toward a plane defined by the bases;

wherein the fibrous or textured portion includes a wall portion covering the outer surface of the first wall, and wherein the fibrous or textured portion includes a ledge portion covering at least a portion of an outer surface of the ledge, the ledge portion connected to the wall portion.

15. The crawling insect pitfall trap of claim 14, wherein the fibrous or textured portion defines a track portion connected to the wall portion and the ledge portion, the track portion traversing the top edge, and the track portion defining a track width that is smaller than a majority of the wall portion width.

16. The crawling insect pitfall trap of claim 15, wherein the ledge portion defines a width that is larger than the track width and decreases as the ledge extends toward the plane defined by the bases.

17. The crawling insect pitfall trap of claim 16, comprising:

an adhesive portion applied to the ledge near the track portion and around at least a portion of a periphery of the ledge portion of the fibrous or textured portion.

18. The crawling insect pitfall trap of claim 16, wherein the ledge includes a plurality of teeth extending over the pitfall cavity, the ledge portion of the fibrous or textured portion covering at least a portion of one or more of the teeth.

19. The crawling insect pitfall trap of claim 14, wherein the ledge includes a plurality of teeth extending over the pitfall cavity, the fibrous or textured portion covering at least a portion of one or more of the teeth.

20. A crawling insect pitfall trap comprising:

a plurality of walls connected to each other, the plurality of walls each extending from a base to a top edge to together define an opening to a pitfall cavity, one or more of the plurality of walls sloped towards the opening, and the plurality of walls each including an outer surface; and a fibrous or textured portion of an outer surface of one or more of the plurality of walls, the fibrous or textured portion extending from the base to the top edge of respective ones of the one or more of the plurality of walls, and the fibrous or textured portion including a fibrous outer surface, wherein the fibrous or textured portion defines a wall portion width that decreases as the fibrous or textured portion extend from a first base to a first top edge of a first outer surface of a first wall of the plurality of walls.

* * * * *